US008496121B2

(12) United States Patent
Dale et al.

(10) Patent No.: US 8,496,121 B2
(45) Date of Patent: Jul. 30, 2013

(54) MACROPOROUS COPOLYMERS WITH LARGE PORES

(75) Inventors: James A. Dale, Cardiff (GB); Vladimir Sochilin, Moscow (RU); Luc Froment, Wales (GB)

(73) Assignee: The Purolite Company, Bala Cynwyd, PA (US)

( * ) Notice: Subject to any disclaimer, the term of this patent is extended or adjusted under 35 U.S.C. 154(b) by 618 days.

(21) Appl. No.: 12/056,166

(22) Filed: Mar. 26, 2008

(65) Prior Publication Data

US 2008/0237133 A1    Oct. 2, 2008

Related U.S. Application Data

(60) Provisional application No. 60/908,172, filed on Mar. 26, 2007.

(51) Int. Cl.
  *B01D 39/02*  (2006.01)
  *B01D 15/08*  (2006.01)
  *B01D 24/00*  (2006.01)

(52) U.S. Cl.
  USPC ............... 210/500.1; 210/198.2; 210/502.1; 210/503

(58) Field of Classification Search
  USPC ............ 210/500.1, 500.21, 500.37, 500.41, 210/656, 660
  See application file for complete search history.

(56) References Cited

U.S. PATENT DOCUMENTS

| | | | |
|---|---|---|---|
| 3,454,493 A * | 7/1969 | Kun et al. | 210/686 |
| 3,729,457 A | 4/1973 | Davankov et al. | |
| 4,224,415 A | 9/1980 | Meitzner et al. | |
| 4,582,859 A | 4/1986 | Lein, Jr. et al. | |
| 5,147,937 A * | 9/1992 | Frazza et al. | 525/243 |
| 5,231,115 A | 7/1993 | Harris | |
| 5,248,435 A * | 9/1993 | Morita et al. | 210/681 |
| 5,512,604 A * | 4/1996 | Demopolis | 521/142 |
| 5,547,551 A * | 8/1996 | Bahar et al. | 210/500.1 |
| 5,552,041 A * | 9/1996 | Afeyan et al. | 210/198.2 |
| 6,103,122 A * | 8/2000 | Hou et al. | 210/502.1 |
| 6,143,548 A | 11/2000 | O'Riordan et al. | |
| 6,258,278 B1 | 7/2001 | Tonelli et al. | |
| 6,323,249 B1 | 11/2001 | Dale et al. | |
| 6,423,666 B1 * | 7/2002 | Liao et al. | 210/198.2 |
| 2002/0052448 A1 | 5/2002 | Wang et al. | |
| 2002/0122946 A1 | 9/2002 | Kuck et al. | |
| 2003/0000028 A1 | 1/2003 | Molock et al. | |
| 2004/0262206 A1 | 12/2004 | Gettman | |
| 2005/0156136 A1 | 7/2005 | SenGupta et al. | |
| 2006/0148985 A1 | 7/2006 | Karthauser | |

FOREIGN PATENT DOCUMENTS

EP    0168622    1/2008

OTHER PUBLICATIONS

"Hypesol-Macronet Sorbent Resins," Purolite Technical Bulletin, The Purolite Company, 1998, title page, image page, pp. 1-11.

(Continued)

*Primary Examiner* — Katherine Zalasky
(74) *Attorney, Agent, or Firm* — Fish & Richardson P.C.

(57) ABSTRACT

The present invention provides a macroporous copolymer having large pores, typically in the range of 5,000-200,000 Å and a typical breaking weight of at least 175 g/bead. The macroporous copolymers can be made using an interpenetrating polymer network (IPN) techniques. These macroporous copolymers may also form macroporous resins. The present invention also provides methods of using the macroporous copolymers and resins.

21 Claims, 5 Drawing Sheets

OTHER PUBLICATIONS

Abrams, Irving M. et al., "A History of the Origin and Development of Macroporous Ion-Exchange Resins," Reactive & Functional Polymers, 1997, 35:7-22.

Badyal, Jas Pal et al., "Comparison of the Effect of Pore Architecture and Bead Size on the Extent of Plasmachemical Amine Functionalisation of Poly(styrene-co-divinylbenzene) Permanently Porous Resins," Polymer, 2004, 45:2185-2192.

Baya, Maria P. et al., "Evaluation of a Hypercrosslinked Polystyrene, MN-200, as a Sorbent for the Preconcentration of Volatile Organic Compounds in Air," Journal of AOAC International, 2000, 83(3):579-583.

Davankov, V. A. et al., "Macronet Isoporous Gels Through Cross-Linking of Dissolved Polystyrene," Journal of Polymer Science, 1974, Symposium No. 47: 95-101.

Davankov, V. A. et al., "Selectivity in Preparative Seperations of Inorganic Electrolytes by Size-Exclusion Chromotography on Hypercrosslinked Polystyrene and Microporous Carbons," Journal of Chromatography A, 2005, 1100:32-39.

Sperling, L. H., "Recent Advances in Interpenetrating Polymer Networks," Polymer Engineering and Science, Jun. 1985, 25(9):517-520.

Sperling, Leslie H., Interpenetrating Polymer Networks and Related Materials, New York: Plenum Press, 1981. title page, bibliographical page, 201-241.

Tsyurupa, M. P., "Macronet Isoporous Ion-Exchange Resins," Journal of Polymer Sciences, 1974, Symposium No. 47:189-195.

* cited by examiner

MACROPOROUS COPOLYMERS WITH LARGE PORES

CROSS REFERENCE TO RELATED APPLICATIONS

This application claims priority to U.S. Provisional Application Ser. No. 60/908,172, filed Mar. 26, 2007, herein incorporated by reference in its entirety.

FIELD OF THE INVENTION

The present invention relates generally to macroporous copolymers having particularly large pores. Specifically, the present invention provides novel macroporous copolymers and resins having large pores, methods of manufacture, and uses thereof.

BACKGROUND OF THE INVENTION

Ion exchange resins include both gel type and macroporous resins. Generally, gel type resins consist of transparent, glassy beads having good breaking weights and high volume capacities allowing for good flow velocity through tall column beds containing the gel beads.

One advanced method of forming gel resins involves the use of interpenetrating polymeric networks (IPN's). IPN's were first conceptualized by John Millar. IPN's are defined as macromolecular assemblies comprising two or more polymers where at least one is in the form of a network; the polymers are at least partially interlaced on a molecular scale although not covalently bonded to each other. Because there is no chemical bonding between the networks (or polymer/network), each may retain its individual properties independently of its individual proportion in the blend material. As a result, improvement can be attained in properties such as mechanical strength, impact resistance, and toughness. There are two main types of IPN's, semi-IPN where at least one component is not in network—i.e., crosslinked—form, and full IPN's where all species are in network form.

The initial experiments to form IPN gels as described by Millar started with a crosslinked styrene-divinylbenzene (DVB) gel copolymer which was re-swollen with fresh styrene-DVB mixtures and the polymerization carried out for a $2^{nd}$ time ($1^{st}$ order IPN), and optionally a $3^{rd}$ time ($2^{nd}$ order IPN), etc. The solvent swelling of the subsequent copolymers was less than that expected for the actual, algebraic amount of DVB present, leading to the conclusion of enhanced entanglement of the polymer networks. Indeed, from this observation, "simple" gel beads themselves, appear to be $0^{th}$ order IPN's.

Although Millar himself was concerned with the use of IPN resins in the field of ion-exchange, many other studies on IPN's have been carried out in other areas, such as the extensive work of Sperling et al. (see Sperling, Polym. Eng. Sci., vol. 25, No. 9, pp. 517-520, 1985 and Sperling "Interpenetrating Polymer Networks and Related Materials," pp. 202-204, 243-261, (Plenum Press, 1981)).

There are currently several methods of producing IPN's of gel networks. U.S. Pat. No. 5,231,115 describes the use of gel-type copolymer seed particles and monovinylidene monomers used to produce IPN's. U.S. Pat. Pub. 2002/01222946 provides IPN's formed from silicone oligomers and silsesquioxane oligomers. U.S. Pat. Pub. 2003/0000028 provides an IPN in tinted contact lenses. U.S. Pat. Pub. 2006/0148985 provides get IPN from silicone polymers where $CO_2$ is used as a solvent. U.S. Pat. Pub. 2002/0052448 discloses forming a first network and thereafter swelling this network with monomers and cross-linking agents to form an IPN. Other IPN's are formed from simultaneously forming and crosslinking the polymer networks.

Barrett et al. in U.S. Pat. No. 4,582,859 found enhanced swellings when forming an IPN where the swelling was over the limit of the starting copolymer. Therefore, further issues, than just the enhanced entanglement found by Millar, need to be considered.

However, gel beads offer poor performance in applications demanding stability to osmotic changes as well as where the resin swells or shrinks greatly, due to changes in ionic form. Gel beads can also be poor performers where bead diffusion is used for the separation/absorption process due to a slow rate of diffusion into the resin beads for the chemical species being separated. To optimize separation capacity for the resin, all available exchange sites within the resin bead volume should be readily available for exchange. This involves using the entire available diffusion path length, which corresponds to the gel bead radius for a fully functionalized resin bead. A relatively long time is required to reach exchange equilibrium when using the full path length due to the limiting rate of diffusion through the beads. Beads that reach exchange equilibrium more rapidly and allow for more rapid access to available exchange sites can be made by reducing the diffusion path length (i.e., making beads with a smaller radius/diameter). However, small beads lead to larger pressure drops with a resin bed, reduced flow rates for feed streams being processed, and other problems related to the handling of fine beads.

Macroporous resins, such as those described by Abrams and J. R. Millar (React. Funct. Polym. 35 (1997), pp. 7-22) and in U.S. Pat. No. 4,224,415, were developed to improve kinetics by providing a highly porous copolymer bead matrix for ion exchange wherein relatively large pore sizes improves diffusion of chemical species into the interior portions of the beads (i.e., ion exchange resins, or IEX resins). Macroporous resins contain significant non-gel porosity in addition to normal gel porosity. This non-gel porosity arises from channels present between the gel lattices. These microscopic channels are separate and distinct from the micropores, which are present in all crosslinked IEX resins, as is well known to those skilled in the art. While the channels are themselves relatively small, they are large when compared with the micropores of the previously known, gel type resins. IEX resins generally have bead diameters within about 150-1,200 µm.

Various macroporous resins and methods for generating macroporosity are known in the art. The terms "macroporous," "macroreticular," "sponge-like," and "channeled" have been used, more or less interchangeably, by those skilled in the art to characterize the hazy to completely opaque beads and resins. "Pore-forming," "phase-separating," "precipitant," and "porogen"—even "diluent" less precisely—have all, likewise, been used to refer to the agent used to produce the macroporous structure.

Macroporous resins having a large pore diameter (i.e., 1-10 µm) have also been formed and are described in U.S. Pat. No. 6,323,249. This resin is exceptionally useful in applications where large species are to be isolated. However, the typical low physical strength of these beads, while acceptable for some applications, severely restricts the use of resins formed from these copolymer beads.

Harris has demonstrated the formation of ion exchange resins which form macroporous crosslinked copolymer particles (EP 0168622). However, these resins are similarly not sufficient for many applications. In addition, the formation of these resins is problematic.

Therefore, there is a need in the art for macroporous resins as well as their copolymer precursors having both large pore size and high strength. There is also a need for effective methods to produce these copolymers and resins efficiently and also economically.

SUMMARY OF THE INVENTION

Copolymers and resins with extremely large and extraordinary pores and enormously increased strength (i.e., strength typical of traditional macroporous resins without such large pores) have been formed by creating an IPN from porous starting copolymers. This degree of improvement is such that these copolymers and resins are no longer precluded from use in the vast majority of ion exchange and other applications.

Therefore, the present invention provides novel copolymers, resins, methods of manufacture, and methods of use of macroporous IPN resins.

Thus, one embodiment of the invention comprises macroporous copolymer comprising an average pore diameter of at least 5,000 Å and a breaking weight of at least 175 g/bead. In one embodiment the average pore diameter is 5,000-100,000 Å. In another embodiment, the average pore diameter of 10,000-200,000 Å. In another embodiment, the breaking weight is at least 300 g/bead. In another embodiment, the breaking weight is at least 400 g/bead. In another embodiment the average pore diameter is 10,000-100,000 Å and the breaking weight is at least 300 g/bead. In another embodiment, the average diameter of the macroporous copolymer bead is 500-5000 μm. In yet another embodiment, the average diameter of the macroporous copolymer bead is 50-500 μm.

In one embodiment, the macroporous copolymer is functionalized and is a resin. In a particular embodiment, the resin is an ion exchange resin. In another embodiment, the macroporous resin has been ground into a powder. In another embodiment, the macroporous resin is a cationic resin and the volume capacity of the resin is 1.1-2.4 eq/L. In another embodiment, the macroporous resin is an anionic resin and the volume capacity is 0.9-1.4 eq/L.

In one embodiment, the macroporous resin was formed by chloromethylating and aminating, or sulfonating the macroporous copolymer.

An embodiment of the invention comprises a method of making crosslinked copolymer particles comprising: forming an initial macroporous copolymer, which is produced by mixing an aqueous suspension polymerization of a $1^{st}$ monomer mixture comprising a monoethylenic monomer, a polyethylenic monomer, and a $1^{st}$ pore-forming agent or agents, initiator or initiators; and thermally polymerizing; reswelling with a $2^{nd}$ monomer mixture comprising a monoethylenic monomer, a polyethylenic monomer, and an optional $2^{nd}$ pore-forming agent, and polymerizing; optionally, reswelling, either step-wise or continuously, with further monomer mixture(s) comprising a monoethylenic monomer, a polyethylenic monomer, and with or without a pore-forming agent, and polymerizing, wherein the crosslinked copolymer particles have an average pore diameter of at least 5,000 Å and a breaking weight of at least 175 g/bead. In one embodiment, the $1^{st}$ pore-forming agent is a $C_1$-$C_{12}$ linear or branched alcohol. In another embodiment, it is methyl isobutyl carbinol or isobutanol, and in another embodiment it is an aliphatic hydrocarbon such as heptane or isooctane. In yet another embodiment, the $1^{st}$ pore-forming agent is a polymer such as polystyrene, poly(alkyleneglycols), or cellulose acetate butyrate.

An embodiment of the present invention comprises a method of cleaning a fluid or gas stream comprising: flowing the fluid or gas stream through the macroporous copolymer of claim 1. In one embodiment, the concentration of at least one of colloidal particles, silica, and metal oxides, slime, crude, fulvic acid, humic acid, tannic acid, viruses, polypeptides, yeast, bacteria cells, fungi, mold, algae, or lichens is reduced. In another embodiment, this concentration is reduced by at least 90%. In one embodiment, the macroporous copolymer has an average pore diameter is approximately 1-10 μm. In another embodiment, the average pore diameter is approximately 1-3 μm.

Another embodiment of the present invention comprises a method of purifying a sample in a solution comprising flowing the sample through the macroporous copolymer or resin as described hereinabove. Another embodiment of the present invention comprises a column at least partially filled with the macroporous copolymer as described above. Preferably, the macroporous copolymer is an ion exchange resin. Another embodiment of the present invention comprises a method of cleaning a fluid or gas stream wherein the method comprises fluidizing the macroporous copolymer as described above in a liquid or gas stream, wherein the fluidizing is either in a column or a batch mode. Another embodiment of the present invention comprises a method of cleaning a fluid or gas stream comprising: obtaining a filter cake comprising the macroporous copolymer as described above and cleaning a fluid or gas stream using the filter cake.

Yet another embodiment of the present invention is a filtration element comprising a filtration medium and an ion exchange resin disposed on a surface of the filtration medium, wherein the ion exchange resin is formed from the macroporous copolymer as described above.

BRIEF DESCRIPTION OF THE DRAWINGS

The following drawings form part of the present specification and are included to further demonstrate certain aspects of the invention. The invention may be better understood by reference to one or more of these drawings in combination with the detailed description of specific embodiments presented herein.

FIG. 4. Scanning electron microscope image (at 1000× magnification) of a strong-acid cation (SAC) resin a.

DETAILED DESCRIPTION

Macroporous Copolymers and Resins

The present invention comprises a macroporous copolymer having large pores and high strength—e.g., crush strength. The macroporous copolymers are copolymers having permanent porosity (permanent "macroporosity," IEX nomenclature). The term macroporous copolymers include macroporous resins, which are functionalized macroporous copolymers. The macroporous resins are crosslinked ion-exchange resins, and can include additional copolymers, and also optionally include adsorbents.

The present invention provides macroporous copolymers having a large pore size with greatly improved physical strength and performance in a number of areas.

The pores created in the copolymers, as described herein, can be formed to have various sizes. The pore diameter (also described herein as pore size) can range typically from about 100 Å to over 200,000 Å (i.e., 20 µm) or higher while the copolymer or resin retains the physical strength associated with copolymer or resin having no pores or only small pores. Preferred macroporous copolymers have a pore diameter of at least 1,000 Å, and more preferably, the pore diameter is at least 5,000 Å (0.5 µm) The pore sizes can be varied by modifying the synthesis parameters. In one embodiment, a macroporous copolymer having a pore size of about 2-3 µm can be formed. In another embodiment, a macroporous copolymer having a pore size of about 5-10 µm can be formed. In another embodiment, a macroporous copolymer having a pore size of about 1-20 µm can be formed. In another embodiment, a macroporous copolymer having a pore size of about 0.5 to 10 µm can be formed. In another embodiment, the macroporous copolymer has a pore size from 1 to 20 µm and a mean pore diameter (D50) of 3.1 to 7 µm. The copolymer can be formed with varying pore density (i.e., "light sponge" to "heavy sponge"), depending upon the intended use. The upper limit of pore diameters is limited by the diameter (e.g. size) of the macroporous copolymer bead.

The velocity of fluid flowing through a packed bed is dependent on the size of the particles. In one embodiment of the invention, the bead diameter is very large, and may have an average diameter of greater than about 1.0 mm or even greater than about 1.2 mm. Standard size beads, such as those having, for example, a 300 to 1,200 µm diameter may also be formed as desired.

The porous copolymers and resins as described herein are strong. They have good breaking weights which is preferably over 175 g/bead. In one embodiment, the bead breaking weight is over 300 g/bead. In another embodiment, the bead breaking weight is over about 400 g/bead. In yet another embodiment, the bead breaking weight is about 175-1000 g/bead. In another embodiment the bead breaking weight is about 175-475 g/bead. In another embodiment, the bead breaking weight is about 200-500 g/bead. They have a physical strength comparable to, or in some instances, even greater than the breaking weight of standard macroporous copolymers and resins, but yet have large pores that allow the use of these orthoporous beads of the present invention in applications for which standard macroporous beads are not suited.

The porous copolymers as described herein preferably have good osmotic-shock and attrition properties.

The orthoporous copolymers of the present invention preferably have a high working capacity comparable to standard macroporous copolymers. In one embodiment, the volume capacity for a cation resin is at least 1.1 eq/L. In another embodiment, the volume capacity is at least 1.2 eq/L. In another, more preferred embodiment, the volume capacity for a cation resin is at least 1.4 eq/L. In one embodiment, the volume capacity for an anion resin is at least 0.9 eq/L. In another, more preferred embodiment, the volume capacity for an anion resin is at least 1.1 eq/L. In one embodiment, the dry weight capacity of the SBA-I is at least 4.0 eq/kg. In another embodiment, the dry weight capacity of the strong base anionic resin (SBA-I) is at least 4.25 eq/kg. In another, more preferred embodiment, the dry weight capacity of the strong acid cationic resin (SAC), $Na^+$ form is at least 4.5 eq/L.

The macroporous copolymers of the present invention have particularly large pores compared with typical macroporous copolymers. The pore size affects the diffusion and flow kinetics through the copolymer material; therefore, the copolymers and resins of the present invention may be used in many applications where previously known copolymers and resins or where it is uneconomical to use them or they simply cannot be used at all. This can be explained through models of flow through the copolymer.

The velocity of fluid flowing through a packed bed is dependent on the size of the particles. "Film diffusion" to a bead is proportional to $1/r$, where r is the bead radius. "Bead diffusion," for gel beads is proportional to $1/r^2$. Macroporous beads, with their small pores, can in principle have diffusion rates somewhat less than $1/r^2$. However, the beads of the present invention can be formed so as to have pore radii similar in size to small beads themselves. Therefore, the diffusion through such a matrix can, indeed, achieve less than $1/r^2$.

The orthoporous structure with its larger pores allows for improved uptake, faster elution, and more efficient regeneration for any bead size, but most importantly for larger bead sizes.

In one embodiment, the orthoporous copolymer or resin is also a Macronet (Davankov et al.; J. Chromatogr. A. 2005 Dec. 23; 1100(1):32-9). Macronet copolymers are copolymers that are crosslinked to provide a stable, rigid, "permanent" micropore structure. They may be formed for example, by hyper-crosslinking (a) linear polystyrene in solution or (b) styrene copolymers in the swollen state, using an alkylating agent under Friedel-Crafts conditions; see U.S. Pat. No. 3,729,457, The Journal of Polymer Science, Symposium No. 47, pages 95-101 and 189-195 (1974), and Purolite Technical Bulletin "Hypersol-Macronet™ Sorbent Resins," The Purolite Co. (PA), pp. 1-11 (1995).

Formation of Orthoporous Copolymers and Resins

The orthoporous copolymers and resins of the present invention can be formed by generating an interpenetrating polymeric network (IPN). This is done by (a) preparing an initial macroporous copolymer, (b) re-swelling, and (c) polymerizing. The present processes provide macroporous polymers. Furthermore, the processes, described herein, are cost effective, for example in comparison to direct routes of forming simple macroporous copolymers and resins.

The orthoporous copolymers and resins of the present invention are formed in several steps. In one embodiment, a first step involves the synthesis of a copolymer by (a) suspending droplets of a homogeneous mixture of monomers with a free radical initiator and porogen(s), such as an aliphatic alcohol—e.g., methyl isobutyl carbinol, isobutyl alcohol, etc.—(b) mixing in an aqueous solution, and then (c) thermally polymerizing. A second step involves combining (reswelling) the $0^{th}$ order IPN, as made in the first step, with another monomer mixture and polymerizing in aqueous suspension, to create a $1^{st}$ order IPN. A third step combines the $1^{st}$ order IPN with additional monomer, to create a $2^{nd}$ order IPN. In one embodiment, a $3^{rd}$ order IPN is formed by using the $2^{nd}$ order IPN as a seed.

Preferably, the mixture of polymerisable monomers used to form the copolymer and to form the IPN comprises a monoethylenically unsaturated monomer, or monomers, and a polyvinylidene monomer. Initiators, suspension agents, stabilizers, etc. may be added to the monomer mixture or aqueous phase as appropriate.

Useful monoethylenically unsaturated monomers include styrene, vinyltoluene, acetoxystyrene, tertiarybutylstyrene, chlorostyrene, vinylpyridine, 2-methyl-5-vinylpyridine, vinylidine chloride, tetrafluoroethylene, vinyl acetate, vinyl stearate, vinyl bromide, vinyl anisole, vinyl naphthalene, acrylic and methacrylic esters and other derivatives. Styrene is preferred.

Useful polyvinylidene monomers for use as a crosslinking agent include divinylbenzene, diisopropenylbenzene, ethyleneglycol dimethacrylate, hexanediol diacrylate, allyl methacrylate, divinyl ketone, divinyl sulfone, trimethylolpropane trimethacrylate, and trivinylbenzene. Divinylbenzene is preferred, and is preferably present in an amount of from 1 to 100%, more preferably 1 to 25%.

One preferred macroporous copolymer is formed when styrene, divinylbenzene and a porogen are mixed together with a polymerization initiator to form the monomer solution. Free radical initiators are most desirable. Free radical generating compounds which may be used to effect polymerization of the monomers include peroxides such as benzoyl peroxide, lauroyl peroxide, tertiary-butyl peroxide, proxy-compounds such as potassium persulfate, sodium perborate and ammonium persulfate and azo compounds such as azo-bisisobutyronitrile, 2,2-azobis-(2-methyl-butyronitrile), 2-t-butylazo-2-cyano propane. Suitable concentrations are from 0.01 to 5.0%, more preferably 0.02 to 3.0%. The monomer phase is added to an aqueous phase for suspension polymerization of the monomers. Salt may be added to the aqueous phase to decrease the water solubility of the monomers.

Various suspension agents and stabilizers such as polyvinylalcohol, methyl cellulose, carboxymethyl cellulose, hydroxyethyl cellulose, poly(vinyl pyrrolidine), polyacrylate salts, polymethyacrylate salts, dimethyldialkylammonium polymers, nitrite and dichromatic salts, calcium phosphate salts, carbonate salts, sulfate salts, bentonite clays, gum arabic, lignosulfonates, gelatine, and xanthan gums in amounts ranging from 0.01 to 1.0% by weight of the monomers may be added to the aqueous dispersion to aid in maintaining the monomers dispersed as droplets while polymerizing the same as beads.

Following formation of the IPN resin, the resin can be sulfonated with sulfuric acid, oleum, sulfur trioxide, or chlorosulfonic acid to form a cation exchanger or, alternatively, it may be chloroalkylated and subsequently aminated to form an anion exchanger.

A wide variety of amines including primary, secondary, and tertiary-alkylamines, or arylamines can be employed in the amination reaction. Polyalkylenepolyamines such as ethylenediamine, diethylenetriamine, triethylene-tetramine, tetraethylenepentamine, propylenediamine, and iminobispropylamine can also be used. Aminoalcohols and dimethylaminoethanol are also useful, as well as hexamethylenetetraamine. A preferred embodiment employs a trialkylamine as the aminating agent, producing a quaternary anion exchanger. Generally, the alkyl radical does not contain more than 4 carbon atoms.

In some embodiments, a strong base anion exchange using a trimethylamine resin is preferred. Weak base anion exchange resins may also be prepared; these resins are prepared in the same manner as the strong base resins with the exception that the tertiary-amine is replaced with non-tertiary amines, such as dimethylamine, diethylamine, monomethylamine, ethanol amines, etc.

Methods of producing ion-exchange resins from corresponding crosslinked copolymer resins are known in the art. Anion exchange resins produced by chloromethylating polystyrene and subsequently aminating are disclosed in U.S. Pat. Nos. 2,591,573; 2,591,574; 2,616,099; 2,616,877; 2,629,710; 2,631,999; 2,632,000; 2,642,417; 2,725,361; 2,794,785; 3,422,160; 3,311,602; 2,953,547; 4,225,677; and 3,425,990. Strongly acid cation exchangers obtained by sulfonation of crosslinked polymers, such as for example crosslinked polystyrenes are disclosed in U.S. Pat. Nos. 2,366,007, 2,466,675, 2,500,149, 2,631,127 and 2,664,801. Other routes known to one of ordinary skill in the art are also envisioned. All U.S. patents and published applications cited herein are hereby incorporated by reference.

Applications

The macroporous copolymers and resins may be used for any standard application for copolymer and resin beads. In many applications, this may be done by simply replacing the original macroporous, microporous, or gel bead with the copolymers or resin beads of the present invention. For example, the copolymers of the present invention may be used as absorbents or filters.

The macroporous resins may be used for any standard application of ion exchange resins, including but not limited to absorption, acid purification/acid retardation, acid removal for corrosion control, beet sugar processing, beverage processing, biotech, cane sugar processing, catalysis of organic reactions, caustic purification, chelating, chemical processing, chromatographic separations, condensate polishing, corn wet milling, demineralization, industrial water treatment, fine chemicals, formic acid removal from formaldehyde, grinding media, ground water, inhibitor and stabilizer removal, ion retardation, metals control, mineral processing, mining, nuclear, organics removal from water, radium removal from ground water, precision fillers, process water purification, pharmaceuticals, salts removal, solvent drying, solvent recovery from air streams, sweeteners, trace contaminant removal, ultrapure chemicals and gases, ultrapure water, Puropack™ systems, Upcore™ systems, Amberpack™ systems, Schweberbed™ systems, voc control, waste water, water softening, and well drilling.

The orthoporous resins may be used to remove contaminants such as dissolved divalent or trivalent metals and cations such as calcium, magnesium, barium, strontium, iron, manganese, aluminum, copper, lead, and nickel. Other contaminants that may be removed include dissolved anionic species such as sulfate and bicarbonate and dissolved silica, phosphate, arsenate, and similar anions.

In addition, because of the large pore size and high strength, the orthoporous resins of the present invention are particularly useful for a variety of applications (a) not possible or (b) not economical for standard gel or standard macroporous ion-exchange resins, in addition to those applications for which gel or standard macroporous resins are suitable.

For example, the orthoporous resin can be used to remove particulate matter, such as colloids, silica, and metal oxides from a fluid. Colloidal particulates generally range in diameter from 8 nm (80 Angstroms) and greater and typically consist of colloidal species of silica, organic matter, iron, manganese, aluminum, copper, lead, nickel, and other metals.

The resin can be used of the removal of slimes and crude.

Since the orthoporous resins can be formed with pore sizes of up to about 10 μm, they can be used to effectively remove acids such as fulvic acid, humic acid, and tannic acid having relatively high molecular weight. The resins are also capable of removing viruses from aqueous solutions. In addition, the resins can be used to remove many things that are too large to be removed by standard macroporous resins. These include, but are not limited to:

| Contaminant | Size |
| --- | --- |
| virus | 20-450 nm |
| humic and fulvic acid | (variable) |
| polypeptides | 3-10 nm |
| yeast | 2 μm |
| bacteria cells | 5-100 μm |
| fungi | >100 μm |
| mold | >100 μm |
| algae | >50 μm |
| lichen | |

The removal of such contaminants with the orthoporous resin is particularly useful since the use of standard macroporous resins is ineffective because of the smaller pore diameters. For example, a standard macroporous resin may have a pore diameter ($d_{50}$) which is approximately the same as the diameter of adenovirus (80 nm, 800 Angstroms), and will not therefore effectively remove the virus or larger components. The contaminant may be removed from a solution such as an aqueous solution. Alternatively, the removal may occur in the gas/vapor phase.

Further, the orthoporous resins can be used to purify the high molecular weight components discussed above. For example, the 80 nm adenovirus contains fibers necessary for activity. With the fibers, the adenovirus is about 140 nm in diameter. Macroporous resins cannot be used for the purification or recovery of infectious adenovirus. U.S. Pat. No. 6,143,548.

In one embodiment, the resin of the present invention is used as an ion exchange resin for pretreatment of water being fed to a reverse osmosis or nanofiltration membrane treatment system to reduce fouling of the membrane surfaces and passageways. See U.S. patent application Ser. No. 12/015,429, herein incorporated by reference.

In one embodiment, a single porous resin that reduces or removes the contaminants is used. In an embodiment, the orthoporous resin comprises two or more different orthoporous resins, such as a strong base resin and a cationic resin.

One measurement of the effectiveness of the orthoporous resins of the present invention is the Silt Density Index (SDI). The SDI value is a numeral value from a standard test in which a sample of the feed water is passed through a 0.45-micron filter and a measurement is taken of how fast the filter becomes fouled. A typical percent reduction of the SDI value for a water stream passing over an orthoporous resin component in a water purification system ranges from 15% to 100%. In a preferred embodiment, the SDI value is reduced at least about 30%. In another preferred embodiment, the SDI is reduced at least about 50%.

Analysis of Copolymer and Resin Pore Structure and Crush Strength (Friability)

The pore structure of orthoporous copolymers and resins is formed by voids or channels between the polymer lattices as the different polymer networks form. Using different parameters for the formation of the IPN provides for different pore size and pore density. Numerous methods of pore characterization have been applied to macroporous copolymers and may be applied to characterize the copolymers of the present invention. Mercury-intrusion porosimetry is (a) not absolute and (b) open to a number of criticisms—e.g., the need to assume a pore shape, usually cylindrical. Nonetheless, it has been found to be direct, reproducible, and consistent, particularly when applied to a series of modified resins and may be used to characterize the copolymers and resins of the present invention. The mercury-intrusion method has long been used to find the distribution of sizes of capillary pores in a porous solid by forcing in mercury, the radius being found from the pressure and the percentage from the volume of mercury absorbed at each pressure. The method is based on the relationship that the pressure required to force pure mercury into a capillary of diameter d is $(-4\sigma \cos \theta)/d$, where $\sigma$ is the surface tension of mercury and $\theta$ is the contact angle of mercury with the porous solid [Proc. Nat. Acad. Sci. U.S.A. (1921) 7:115]. Since, for a particular solid, the surface tension and the contact angle are constants, penetration of mercury into the pores, at a known pressure, indicates the corresponding pore diameter while the amount of mercury intruded, indicates the porosity or volume of pores of a given diameter.

A common indicator of suspended solids particles present in the water is turbidity, measured in units referred to as Nephelometric Turbidity Units (NTU). NTU are defined as the intensity of light at a specified wavelength scattered or attenuated by suspended particles or absorbed at a method-specified angle (e.g., 90°) from the path of the incident light compared to a standard. For reverse osmosis applications, a maximum turbidity of 1 NTU preferred, and a turbidity of 0.5 NTU is even more preferred.

As used herein, the term "crush strength," refers to the mechanical load required to break individual copolymer beads, and is used interchangeably with the term "friability." Crush strength is the number average crush strength of the individual crush strengths of a sample comprising at least 10 beads, each bead having a similar particle diameter, wherein crush strength is the total force required to crush each bead.

The macroporous copolymers and resin of the present invention has a high crush strength, which, in one embodiment, can be defined as a breaking-weight or Chatillon value. The high crush strength allows the copolymer to be used in tall vessels, pressurized vessels, and in packed beds, and where the beads are subjected to repeated exhaustion and regeneration, bead expansion and contraction, cycles which causes beads without high crush strength to fracture or, worse, disintegrate. Potentially, the bead fragments can plug frits or be eluted from the vessel and foul the membrane filters. The efficacy of the remaining copolymer is also reduced for copolymers having lower crush strength. Other uses for high crush strength copolymers and resins include chromatography, hydrometallurgy, and catalysis.

Crush strength can be measured using the Chatillon test. The Chatillon test is named for an apparatus manufactured by John Chatillon and Sons, New York, N.Y. and is designed to measure friability. This instrument measures the force (grams) required to crack or fracture a copolymers bead when it is placed between two parallel plates. The plates are gradually brought together at a uniform rate until the bead "breakpoint" is reached. The purpose of this test is to simulate the frictional and pressure forces exerted on individual copolymer beads under actual use conditions.

Specifications for testing include converting the resin into the proper form (hydrogen or sodium for cation resins and chloride form for anion resins) by well known standard procedures. The converted resin is screened to a −20+30 U.S. mesh cut size and then allowed to fully hydrate in de-ionized water for at least 15 minutes prior to testing—or in Europe, 710 microns, hydrated. Actual testing is done on a single resin bead (covered by a small drop of water) in the Chatillon instrument using the lowest practical speed of descent of the crushing plate. The individual fragmentation forces are recorded from the instrument in grams per bead and the results are presented as an average (20 beads minimum, typically 25 or 30 beads), a standard deviation, a 95% confidence interval, and the percentage of beads which meet a minimum friability standard.

Preferably, the crush strength of the orthoporous copolymer is at least 300 g per bead. More preferably, the crush strength is at least 350 g per bead. More preferably, the Chatillon value for the macroporous copolymer is a least 400 g per bead. Even more preferably, the Chatillon value for the macroporous copolymer is a least 500 g per bead.

The high crush strength is important since copolymers having lower crush strength have the disadvantage that, due to the need, in many applications, to contain and operate the copolymers in pressurized vessels and the need to subject the beads to repeated exhaustion and regeneration cycles, the beads tend to fracture. Potentially the fractured bead then can be eluted from the vessel and foul the membrane filter; the efficacy of the remaining copolymer is also reduced for copolymers having lower crush strength.

Definitions

As used herein, the term "simultaneous," means at the same time or within several minutes. When used in conjunction with copolymers or resin regeneration or rejuvenation, "simultaneous regeneration or rejuvenation" means that the regeneration or rejuvenation occurs in a single process step by the addition of a single regenerant. It is understood that one chemical regeneration process may proceed at a different rate than another chemical regeneration process.

The term "about" or "approximately" means within an acceptable error range for the particular value as determined by one of ordinary skill in the art, which will depend in part on how the value is measured or determined, and includes errors from the limitations of the measurement system and the degree of precision required for a particular purpose, such as a pharmaceutical formulation. For example, "about" can mean within 1 or more than 1 standard deviations, as per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value. Where particular values are described in the application and claims, unless otherwise stated, the term "about" meaning within an acceptable error range for the particular value should be assumed.

As used herein and in the appended claims, the singular forms "a," "an," and "the," include plural referents unless the context clearly indicates otherwise. Thus, for example, reference to "a molecule" includes one or more of such molecules, "a resin" includes one or more of such different resins and reference to "the method" includes reference to equivalent steps and methods known to those of ordinary skill in the art that could be modified or substituted for the methods described herein.

As used herein, the phrase "reduces contaminant" means that at least 40% of the measurable contaminant (or contaminants) is removed from the sample (i.e., a fluid stream). More preferably, at least 60% of the contaminant is removed. Even more preferably, at least 70% of the contaminant is removed, and even more preferably, at least 80% of the contaminant is removed. Most preferably, at least 90% or more of the contaminant concentration is removed.

As used herein, the phrase "removes contaminant" means that at least 95% of the measurable contaminant (or contaminants) is removed from the sample (i.e., a fluid stream). More preferably, at least 98% of the contaminant is removed. Even more preferably, at least 99% of the contaminant is removed, and even more preferably, at least 99.5% of the contaminant is removed. Most preferably, at least 99.9% or more of the contaminant concentration is removed.

As used herein, the terms "diameter" and "size," when referring to colloids, are both defined as the average diameter of the colloidal particles or the average diameter of the pore within the colloidal particles, as appropriate.

As used here, the term "reswelling" refers to the process by which a polymer is suspended in a solution such as a porogen solution.

As used herein, "bacteria" refers to small prokaryotic organisms (linear dimensions of around 1 μm) with non-compartmentalized circular DNA and ribosomes of about 70S. Bacteria protein synthesis differs from that of eukaryotes. Many anti-bacterial antibiotics interfere with bacteria proteins synthesis but do not affect the infected host.

As used herein, "virus" refers to an obligate intracellular parasite of living but non-cellular nature, consisting of DNA or RNA and a protein coat. Viruses range in diameter from about 20 to about 300 nm. Class I viruses (Baltimore classification) have a double-stranded DNA as their genome; Class II viruses have a single-stranded DNA as their genome; Class-III viruses have a double-stranded RNA as their genome; Class IV viruses have a positive single-stranded RNA as their genome, the genome itself acting as mRNA; Class V viruses have a negative single-stranded RNA as their genome used as a template for mRNA synthesis; and Class VI viruses have a positive single-stranded RNA genome but with a DNA intermediate not only in replication but also in mRNA synthesis. The majority of viruses are recognized by the diseases they cause in plants, animals and prokaryotes. Viruses of prokaryotes are known as bacteriophages.

As used herein "fungus" refers to a division of eukaryotic organisms that grow in irregular masses, without roots, stems, or leaves, and are devoid of chlorophyll or other pigments capable of photosynthesis. Each organism (thallus) is unicellular to filamentous, and possesses branched somatic structures (hyphae) surrounded by cell walls containing glucan or chitin or both, and containing true nuclei.

EXAMPLES

The following examples are included to demonstrate preferred embodiments of the invention. It should be appreciated by those of skill in the art that the techniques disclosed in the examples, which follow, represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Synthesis of Copolymers

A. Synthesis Using Methyl Isobutyl Carbinol (MIBC)

| Water phase | | Monomer mixture | |
|---|---|---|---|
| Water | 1,000 ml | Styrene | 390 g |
| TSP•12H$_2$O | 50 g | Divinylbenzene (80%) | 10 g |
| CaCl$_2$•2H$_2$O | 50 g | MIBC | 320 g |
| Hydroxyethylcellulose | 3 g | Azobisisobutyronitrile | 2 g |
| Lignosulfonate | 3 g | Benzoperoxide (BPO) (75%) | 4 g |
| Salt (NaCl) | 100 g | | |

Procedure:
Place water in 2-liter stirred reactor.
Add the trisodium phosphate (TSP) and CaCl$_2$
Add a mixture of the hydroxyethylcellulose and the lignosulfonate, and stir until dissolved.
Add the salt.
At 84° C. add the monomer mixture and polymerization at 80° C. for 1 hr 20 min.
Polymerization: 4 hr at 82° C.; 1 hr at 88° C.
Heat to distill off MIBC over time.
Cool, sequentially wash the copolymer (0$^{th}$ order IPN) with water, dilute acid, dilute caustic, water, and dry, then sieve as wanted.

B. Synthesis Using Isobutyl Alcohol (IBA)

| Water phase | | Monomer mixture | |
|---|---|---|---|
| Water | 1,000 ml | Styrene | 364 g |
| Gelatin | 6 g | Divinylbenzene (63%) | 12 g |
| Lignosulphonate | 1.4 g | IBA | 240 g |
| Salt | 140 g | Azobisisobutyronitlrile | 1.2 g |
| | | Benzoyl peroxide (75%) | 2.8 g |

Procedure:
Place water in 2-liter stirred reactor.
Add gelatin and stir until dissolved.
Add lignosulfonate.
Add salt.
At 84° C. add monomer phase.
Polymerization at 80° C. for 1 hr 30 min.
Polymerization: 4 hr at 82° C.; 1 hr at 88° C.
Heat to distill off IBA over time.
Cool, wash with water, dilute acid, dilute caustic, water, and dry, and then sieve as wanted.

Example 2

Formation of Interpenetrating Polymeric Networks (IPN's)

A. 1-Step Process

| 1$^{st}$ Water phase | |
|---|---|
| Water | 800 ml |
| Seeds from I.B., above | 160 g |
| 2$^{nd}$ Water phase | |
| 3% gelatin solution in DI water | 400 ml |
| NaNO$_2$ | 0.04 g |
| Monomer mixture | |
| Styrene | 241.4 g |
| Divinylbenzene (80%) | 30.6 g |
| Benzoyl peroxide (75%) | 3 g |

Procedure:
Place 1$^{st}$ water phase and seeds in 2-liter stirred reactor.
Heat to 60° C. and add monomer mixture.
Stir at 60° C. for 2 hours.
Then add the gelatine solution and nitrite (i.e., 2$^{nd}$ Water phase) and heat to 82° C.
Polymerization: 3 hr at 82° C.; 1 hr at 92° C.
Cool, wash the 1$^{st}$-order IPN copolymer, dry.
A reaction using this procedure yielded 410 g (95%) of the polymer.

B. 2-Step Process

| 1$^{st}$ water phase | |
|---|---|
| Water | 600 ml |
| Seeds from I.A., above | 150 g |
| SDS | 4 g |
| 2$^{nd}$ Water phase | |
| 2.5% gelatine solution in DI water | 400 ml |
| NaNO$_2$ | 0.04 g |
| 1$^{st}$ Monomer mixture | |
| Styrene | 175.5 g |
| Divinylbenzene (80%) | 4.5 g |
| Benzoyl peroxide (75%) | 3 g |
| 2$^{nd}$ Monomer mixture | |
| Styrene | 212 g |
| Divinylbenzene (80%) | 52 g |

Procedure:
Place 1$^{st}$ water phase (and seeds) in 2-liter stirred reactor.
At 60° C. add 1$^{st}$ monomer phase.
Stir at 60° C. for 1 hour
Then add gelatine solution and nitrite (2$^{nd}$ Water phase) and heat to 82° C.
1$^{st}$ Polymerization: 1 hr 30 min at 82° C.
Cool to 74° C., and add 2$^{nd}$ monomer mixture
Stir at 74° C. for 30 min.
Then heat to 82° C.
2$^{nd}$ polymerization: 3 hr at 82° C.; 1 hr at 92° C.
Cool, wash the 2$^{nd}$-order IPN copolymer
A reaction using this procedure yielded 582 g (98%) of seeded copolymer

C. 2-Steps Process

| 1$^{st}$ water phase | |
|---|---|
| Water - | 550 ml |
| Seeds from I.B., above | 120 g |
| SDS | 4 g |
| 2$^{nd}$ water phase | |
| 2.3% gelatin solution in DI water | 450 ml |
| NaNO$_2$ | 0.04 g |
| 1$^{st}$ Monomer mixture | |
| Styrene | 175.5 g |
| Divinylbenzene (80%) | 4.5 g |

-continued

| Benzoyl peroxide (75%) | 3.5 g |
|---|---|
| 2$^{nd}$ monomer mixture | |
| Styrene | 247.5 g |
| Divinylbenzene (80%) | 52.5 g |

Procedure:
Place 1$^{st}$ water phase in 2-liters stirred reactor
At 60° C. add 1$^{st}$ monomer mixture
Stir at 60° C. during 1 hour 30 min.
Then add gelatine solution and nitrite (i.e., 2$^{nd}$ Water phase) and heat to 82° C.
1$^{st}$ Polymerization: 1 hr 30 min at 82° C.
Cool to 74° C. and add 2$^{nd}$ monomer mixture
Stir at 74° C. for 1 hr min
Then heat to 82° C.
2$^{nd}$ polymerization: 3 hr at 82° C.; 1 hr at 92° C.
Cool, wash the 2$^{nd}$-order IPN copolymer
A reaction using this procedure yielded 576 g (96%) of seeded copolymer.

Example 3

Synthesis of a Strong-Acid Cation Resin

Step-1:
A 1 liter of water suspension was prepared using 45 g of trisodiumphosphate.12H$_2$O, 45 g calcium chloride dihydrate, 10 g lignosulfonate, 2.8 g hydroxyethyl-cellulose and 105 g of NaCl.

When the salts were dissolved and the temperature of the solution had reached 80° C., a monomer solution composed of 426 mL of styrene, 14 mL of divinylbenzene (63%), 319 mL of isobutanol, 3 g of benzoyl peroxide (75%), 1.3 g of azobis-isobutyronitrile and 0.2 g Vazo-88™, was added.

The temperature was kept at 80° C. until the soft gel point, then it was increased to 82° C. and kept 4 hours at that temperature. The temperature of the batch was then increased to 85° C. for 1 hour and lastly to 95° C. for 2 hours.

The beads were washed and dried.
Step-2:
50 g of the copolymer obtained in the Step-1 was added to a solution of 800 mL of water with 1 g of sodium dodecyl sulfate.

The batch was heated to 82° C. When the batch reached 82° C., a monomer mixture of 248 mL of styrene, 77 mL DVB (63%), and 3.6 g benzoyl peroxide (75%), was added continuously, at a flow rate of 0.64 g monomers per minute.

When the monomers addition was finished, the batch was kept 135 minutes at 82° C., then 60 minutes at 88° C., and 60 minutes at 95° C.

The beads were washed and dried.
Step-3:
100 g of the copolymer obtained in Step-2 was added to a solution of 160 mL of sulfuric acid (96%) and 280 mL of oleum (20%).

The temperature was increased to 115° C. at a rate of 1° C. per minute, and kept for 3 hours at that temperature.

The batch was cooled down, diluted by direct addition of water, and washed further. A solution of caustic was used to convert the resin to the sodium form.

Figure 1:
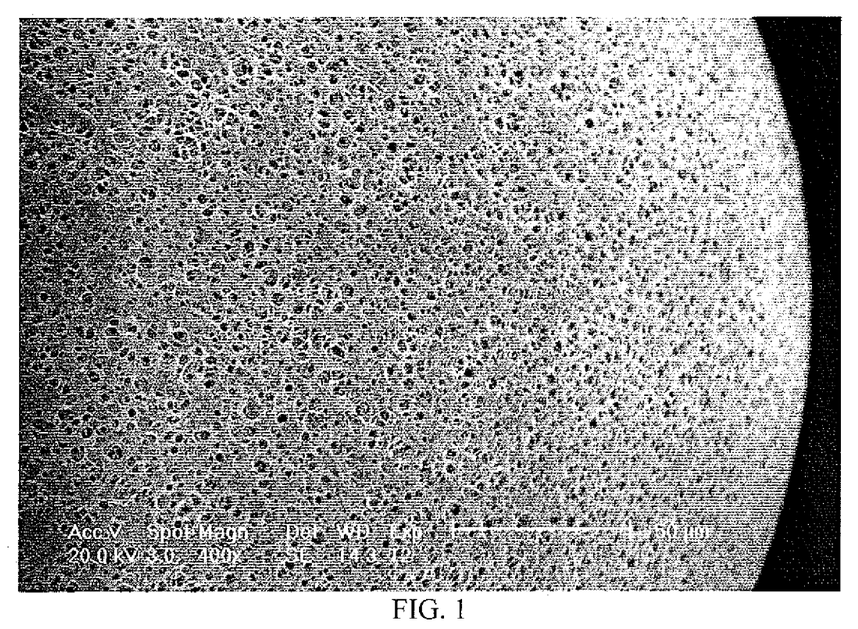
FIG. 1. Scanning electron microscope image of a strong cation resin having a pore volume of 0.33 mL/g and $d_{50}$ is 8710 Å at 400× magnification.
Figure 2:
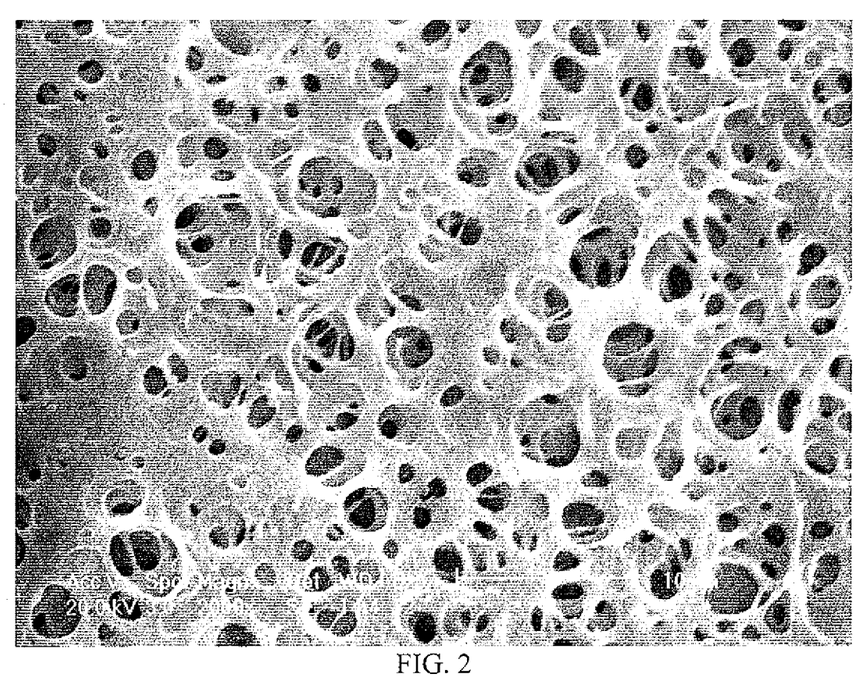
FIG. 2. Scanning electron microscope image of a strong cation resin having a pore volume of 0.33 mL/g and $d_{50}$ is 8710 Å at 2000× magnification.
Figure 3:
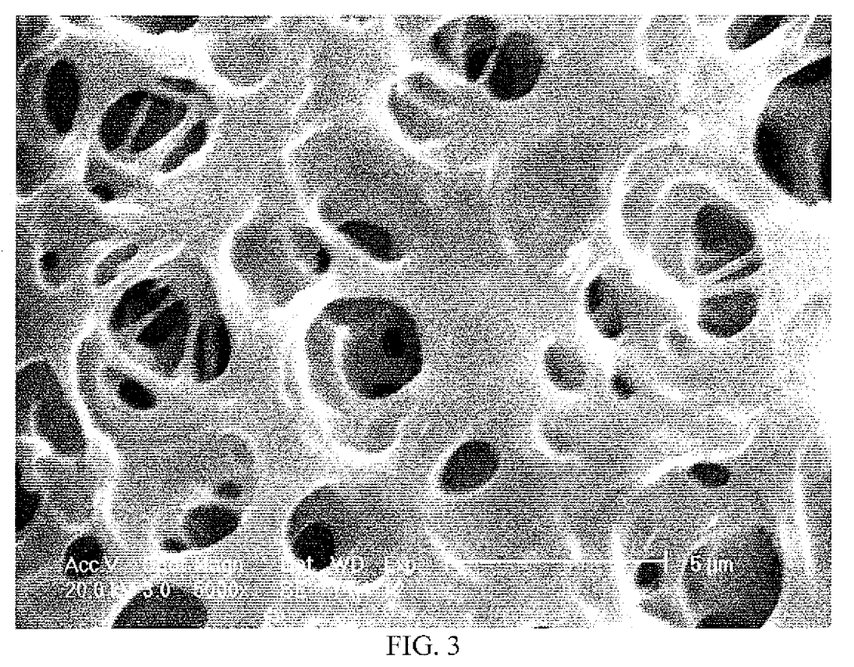
FIG. 3. Scanning electron microscope image (at 5000× magnification) of a strong cation resin having a pore volume of 0.33 mL/g and $d_{50}$ is 8,710 Å (Hg-intrusion porosimetry).

The resin had a volume capacity (Na$^+$ form) of 1.99 eq/L, a dry weight capacity of 4.60 eq/kg, and a moisture of 45.7 weight %. The average breaking weight is 642 g/bead, zero below 200 g, and the optical aspect after 100 cycles was 98% perfect. The pore volume is 0.33 mL/g and the d$_{50}$ is 8,710 Å. FIG. 1, FIG. 2, and FIG. 3 are scanning electron microscope images of this strong-acid cation resin.

Example 4

Synthesis of a Strong Acid Cation Resin

Step-1:
The same starting copolymer as in the Example 3 was used.
Step-2:
50 m of the copolymer obtained in the step 1 was added to a solution of 800 mL of water with 1 g of sodium dodecyl sulfate.

The batch was heated to 78° C.
When the batch reached 78° C., a monomers solution of 248 mL of styrene, 77 mL DVB (63%), and 3.6 g benzoyl peroxide (75%) was added in a continuously, at a flow rate of 0.62 g monomers per minute.

When the monomers addition was finished, the batch was kept 55 minutes at 78° C. then 60 minutes at 82° C., 60 minutes at 78° C. and 60 minutes at 95° C.

The batch was washed and dried.
Step-3:
100 g of the copolymer obtained in Step-2 was added to a solution of 160 mL of sulfuric acid (96%) and 280 mL of oleum (20%). The temperature was raised to 115° C. at a rate of 1° C. per minute and kept for 3 hours at that temperature.

The batch was cooled down and diluted by directly adding water, and washed. A solution of caustic was used to convert the resin to the sodium form.

Figure 4:
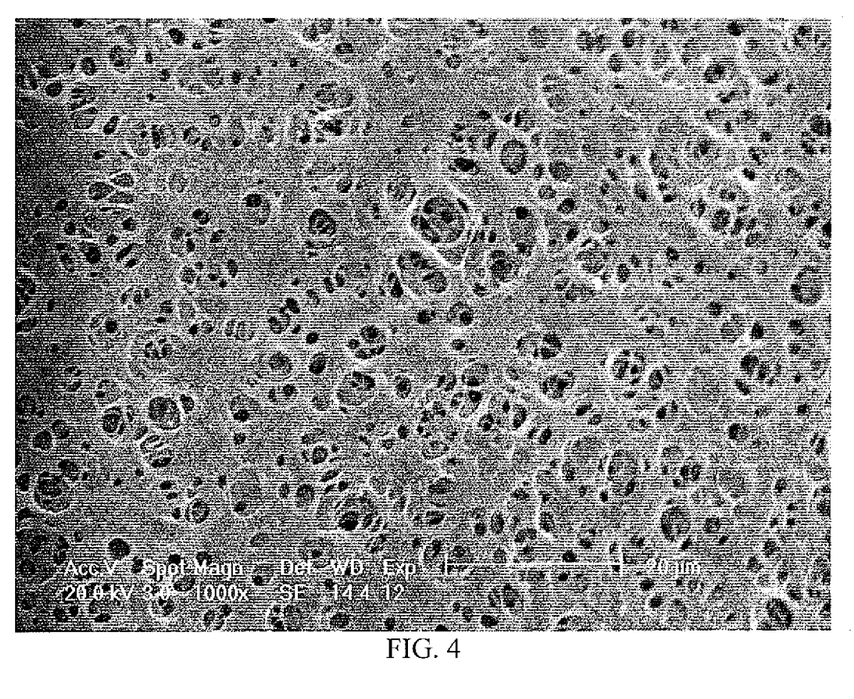

This SAC resin had a volume capacity (Na$^+$ form) of 2.07 eq/liter, a dry weight capacity of 4.53 eq/kg, and a moisture of 45.7 wt. %. An SEM image of this resin is shown in FIG. 4.

Example 5

Synthesis of a Strong Acid Cation Resin

Step-1:
A 1 liter water suspension was prepared using 8.2 g gelatin, 41 g magnesium sulfate, 35 g sodium sulfate, 6 g lignosulfonate, 44 mL caustic solution (47%) and 100 g of NaCl.

When the salts were dissolved and the temperature of the solution reached 80° C., a monomers solution composed of 426 mL of styrene, 14 mL of divinylbenzene (63%), 319 mL of isobutanol, 3 g of benzoyl peroxide (75%), 1.3 g of azobis-isobutyronitrile and 0.2 g Vazo-88™ was added.

The temperature was kept at 80° C. until the soft gel point, then it was increased to 82° C. and kept 4 hours at that temperature. The temperature of the batch was increased to 85° C. for 1 hour and lastly to 95° C. for 2 hours.

The batch was washed and dried.
Step-2:
50 g of the copolymer obtained in the Step-1 was added to a solution of 800 mL of water with 1 g of sodium dodecyl sulfate.

The batch was heated to 82° C. When the batch reached 82° C., 94 mL of a monomer mixture of 198 mL of styrene, 46.7 mL divinylbenzene (63%), and 2.7 g benzoyl peroxide (75%) was added.

One hour after the first addition, 50 mL of the same monomer mixture was added. Another 50 mL of the same monomers was added 1 hour later, then 1 hour later the remaining monomers was added.

When the monomers addition was finished, the batch was held 120 minutes at 82° C., then 60 minutes at 88° C., and lastly 60 minutes at 95° C.

The batch was washed and dried.

Step-3:

100 g of the copolymer obtained in Step-2 was added to a solution of 160 mL of sulfuric acid (96%) and 280 mL of oleum (20%). The temperature was raised to 115° C. at a rate of 1° C. per minute and kept for 3 hours at that temperature.

The batch was cooled down, directly diluted with water, and washed. A solution of caustic was used to convert the resin to the sodium form.

Figure 5:
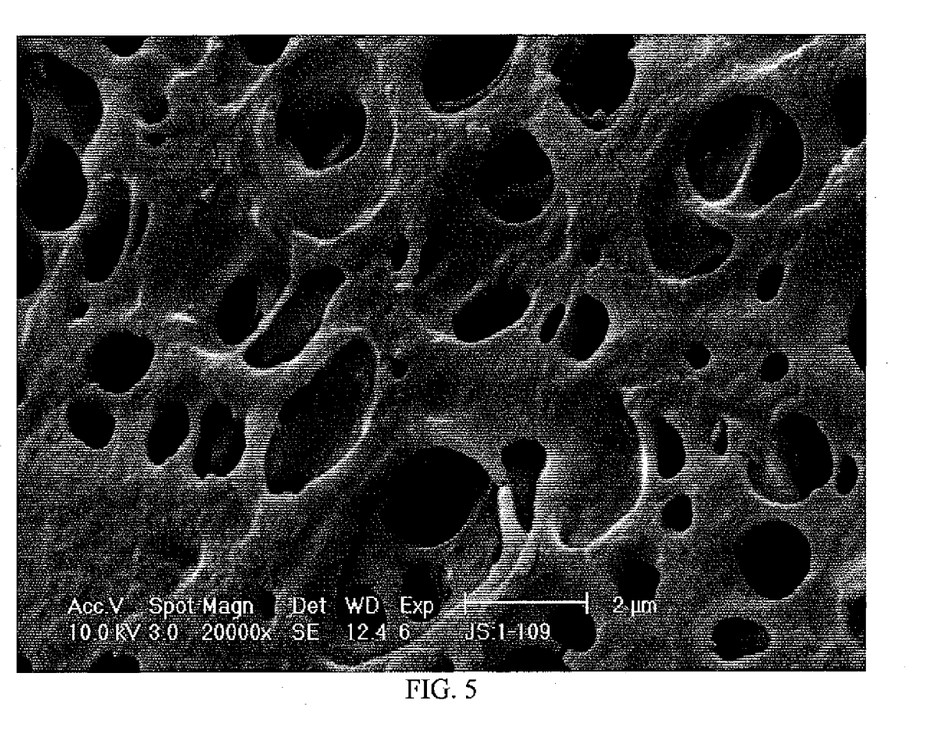
FIG. 5. Scanning electron microscope image (at 20,000× magnification) of a SAC resin having an effective size of 684 μm and median diameter of 810 μm.

This SAC resin had a volume capacity (Na$^+$ Form) of 1.82 eq/liter, a dry weight capacity of 4.71 eq/kg, and a moisture of 50.7 wt. %. The average breaking weight is 408 g/bead, and the optical aspect after 100 cycles was 95% perfect. The effective size was 684 microns and the median diameter is 810 microns. SEM of this sample is provided in FIG. 5.

Example 6

Synthesis of a Strong Acid Cation Resin

Step-1:

As example 3.

Step-2:

50 g of the copolymer obtained in the Step-1 was added to a solution of 200 mL of water with 1 g of sodium dodecyl sulfate. The batch was heated to 60° C. At 60° C., a mixture of 58 g of styrene, 1.9 g divinylbenzene, and 0.9 g benzoyl peroxide (75%) was added.

After 1 hour, a solution composed of 220 mL water, 4.4 g gelatine, and 0.02 g sodium nitride was added, and the temperature increased to 82° C.

The batch was kept at 82° C. for 90 minutes, then the decreased to 75° C. At 75° C., a mixture of 25.1 g styrene and 63.9 g divinylbenzene (63%) was added and the temperature kept at 75° C. for 30 minutes. The temperature was then increased to 82° C. for 2 hours and lastly to 95° C. for 90 minutes.

The batch was washed and dried.

Step-3:

As Example 3

A SAC resin was obtained with a volume capacity (Na$^+$ Form) of 1.67 eq/liter, a dry weight capacity of 4.46 eq/kg, and a moisture of 50.7 wt. %.

Example 7

Synthesis of a Strong Acid Cation Resin

Step-1:

A 1 liter water suspension was prepared using 45 g of trisodium phosphate.12HOH, 45 g calcium chloride dihydrate, 6 g lignosulfonate, 2.8 g hydroxyethylcellulose, and 115 g of NaCl.

When the salts were dissolved and the temperature of the solution reached 80° C., a monomers mixture composed of 436 mL of styrene, 14 mL of divinylbenzene (63%), 319 mL of isobutanol, 3 g of benzoyl peroxide (75%), 1.3 g of azobis-isobutyronitrile, and 0.2 g Vazo-88™ was added.

The temperature was kept at 80° C. until the soft-gel point, and then it was increased to 82° C. and kept 4 hours at that temperature. The temperature of the batch was then increased to 85° C. for 1 hour and finally to 95° C. for 2 hours.

The batch was washed and dried.

Step-2:

50 g of the copolymer obtained in the Step-1 was added to a solution of 1,000 mL of water with 1 g of sodium dodecyl sulfate.

The batch was heated to 82° C. When the batch reached 82° C., a monomer mixture of 430 mL of styrene, 58.5 mL divinylbenzene (63%), and 5.4 g benzoyl peroxide (75%) was added continuously, at a rate of 0.65 g per minute.

When the monomers addition was finished, the batch was held 130 minutes at 82° C., then 60 minutes at 88° C., and lastly 60 minutes at 95° C.

The batch was washed and dried.

Step-3:

80 g of the copolymer obtained in Step-2 was added to a solution of 160 mL of sulfuric acid (96%) and 280 mL of oleum (20%). The temperature was raised to 115° C. at a rate of 1° C. per minute and kept for 3 hours at that temperature.

The batch was cooled down, diluted directly with water, and washed. A solution of caustic was used to convert the resin to the sodium form.

A volume capacity (Na$^+$ form) of 1.46 eq/liter, a dry weight capacity of 4.60 eq/kg, and a moisture content of 46.3% was obtained.

Example 8

Type-I Strong-Base Anion-Exchange Resin

Step-1:

As example 3.

Step-2:

75 g of the copolymer obtained in the Step-1 was added to a solution of 800 mL of water with 1.5 g of sodium dodecyl sulfate. The batch was heated to 60° C. At 60° C., a mixture of 87 g of styrene, 2.85 g divinylbenzene, and 1.2 g benzoyl peroxide (75%) was added.

After 1 hour, a solution composed of 330 mL water, 6.6 g gelatin, and 0.03 g sodium nitride was added, and the temperature increased to 82° C. The batch was kept at 82° C. for 90 minutes, and then the temperature was decreased to 75° C.

At 75° C., a mixture of 127 g styrene and 4.1 g divinylbenzene (63%) was added, and the temperature kept at 75° C. for 30 minutes. The temperature is then increased to 82° C. for 2 hours and lastly to 95° C. for 90 minutes.

The batch was washed and dried.

Step-3:

The copolymer was chloromethylated according to the comparative reference process of U.S. Pat. No. 4,225,677; and aminated with excess trimethylamine to give a Type-I strong-base anion-exchange resin with a volume capacity of 1.21 eq/liter, dry weight capacity of 4.36 eq/kg, and a moisture content of 59.5 wt. %.

Example 9

Large Species and Improved Kinetics

Kinetics of various resins were compared. The classic, Abrams' "Green Dye (Fast Green FCF, mw=808)" test (I. M. Abrams, Ind. Eng. Chem., Prod. Res. Dev., Vol. 14, No. 2, 1975, p 108-112, herein incorporated by reference) was applied to compare (a) a resin of the present invention described as "A500/2788 Orthoporous" resin; (b) A500, a traditional or standard macroporous resin; and (c) A501P, a very large-pore resin but with limited physical strength. A gel resin (A600) was also analyzed. The test was performed at a pH of 1-6, 850 µm beads, and 150-800 rpm. Parameters of these resins are:

TABLE 1

| | "A500/2788 OP" 117R/06/5 | A500/2788 std. 189Q/06/5 | A500 std. 154V/06/5 | A501P 133/05/5 | A600 (gel) 418U/07/6 |
|---|---|---|---|---|---|
| Pore diameter, ave., Ang. | 6,704 | 378 | 470 | 59,331 | — |
| Pore volume, ml/g | 0.36 | 0.34 | 0.38 | 1.90 | — |
| surface area, $m^2/g$ | low ($\leq 3$) | 26 | 25 | low ($\leq 3$) | — |
| volume capacity, eq/liter | 1.27 | 1.29 | 1.19 | 0.83 | 1.50 |
| dry weight capacity, eqkg | 3.78 | 3.71 | 3.73 | 3.93 | 3.70 |
| Bead moisture, wt. % | 52.4 | 51.1 | 54.7 | 67.6 | 43.0 |
| crush strength, ave., g/bead | 534 | 631 | 551 | 66 | 1,060 |

Figure 6:
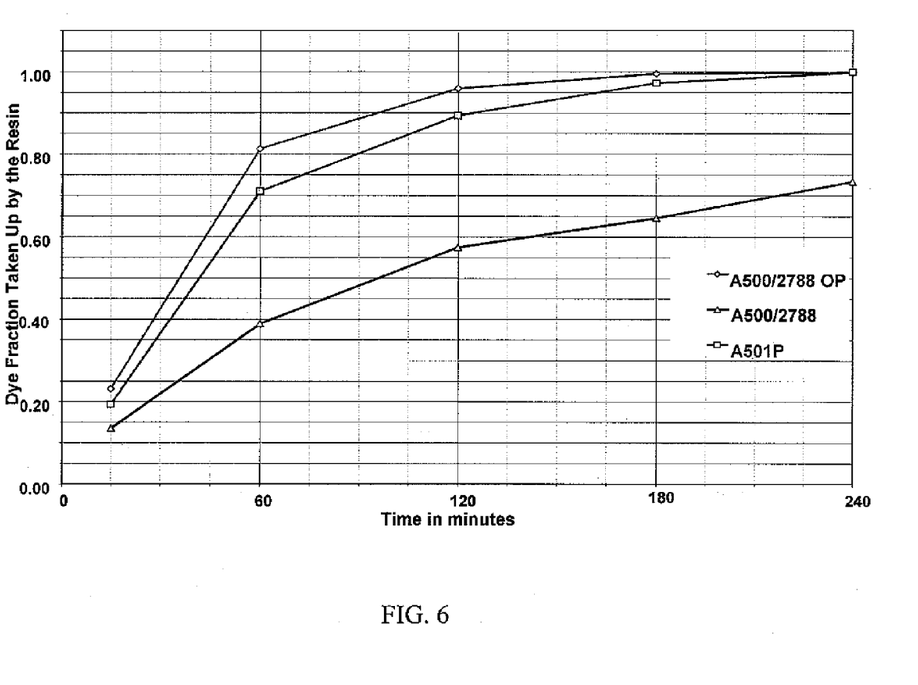
FIG. 6. Chart of a green dye test showing dye fraction taken up by the resin over time at pH 6, 850 μm, and 800 rpm.

Results of the tests are given in Tables 2-5 and FIG. 6. The tables provide the dye fraction taken up by the resin at various times, pH, and dye concentration, and stirring rates

TABLE 2 pH 6, 850 micron beads, 800 rpm stirring, 0.5 g wet beads, 100 mls 1 ppm dye solution

| Time Min. | "A500/2788 OP" 117R/06/5 | A500/2788 std. 189Q/06/5 | A501P 133/05/5 |
|---|---|---|---|
| 0 | 0 | 0 | 0 |
| 15 | 23.1 | 13.5 | 19.3 |
| 60 | 38.9 | 71.0 | 71.0 |
| 120 | 81.3 | 57.4 | 89.3 |
| 180 | 95.9 | 64.5 | 97.2 |
| 240 | 99.8 | 73.3 | 99.8 |

TABLE 3 pH 1, 850 micron beads, 150 rpm stirring, 0.5 g wet beads, 100 mls 1 ppm dye solution

| Time Min. | "A500/2788 OP" 117R/06/5 | A500/2788 std. 189Q/06/5 | A501P 133/05/5 |
|---|---|---|---|
| 0 | 0 | 0 | 0 |
| 15 | 22.8 | 11.5 | 9.6 |
| 60 | 29.1 | 25.5 | 27.4 |
| 120 | 54.6 | 38.7 | 49.9 |
| 180 | 67.3 | 51.2 | 63.2 |
| 240 | 84.0 | 60.0 | 72.1 |

TABLE 4 pH 1, 850 micron beads, 800 rpm stirring, 0.5 g wet beads, 100 mls 1 ppm dye solution

| Time Min. | "A500/2788 OP" 117R/06/5 | A500/2788 std. 189Q/06/5 |
|---|---|---|
| 0 | 0 | 0 |
| 15 | 40.6 | 37.9 |
| 60 | 78.7 | 69.0 |
| 120 | 93.8 | 86.8 |
| 180 | 97.4 | 92.6 |
| 240 | 99.1 | 96.5 |

TABLE 5 pH 1, 850 micron beads, 800 rpm stirring, 0.5 g wet beads, 100 mls 2 ppm dye solution

| Time Min. | "A500/2788 OP" 117R/06/5 | A500/2788 std. 189Q/06/5 |
|---|---|---|
| 0 | 0 | 0 |
| 15 | 39.3 | 22.0 |
| 60 | 64.4 | 43.4 |

TABLE 5-continued pH 1, 850 micron beads, 800 rpm stirring, 0.5 g wet beads, 100 mls 2 ppm dye solution

| Time Min. | "A500/2788 OP" 117R/06/5 | A500/2788 std. 189Q/06/5 |
|---|---|---|
| 120 | 81.6 | 59.4 |
| 180 | 93.9 | 73.2 |
| 240 | 99.0 | 82.4 |

The results of the green dye test are also provided in FIG. 6 which demonstrates the increased uptake of dye over time of the resin of the present invention at pH 6, 850 μm, and 800 rpm.

Example 10

Small Species and Neutralization Kinetics

An (a.) "A500/2788 Orthoporous" resin; (b.) "A500," a traditional or standard macroporous resin; (c.) "A501P," a very large-pore resin but with limited physical strength, and (d.) A600, a gel resin, were converted to the hydroxide form. Then each of these resins were added to 0.1 N HCl stirred at 800 rpm, the volume of which equaled 75% of the resin equivalents. The time it took the resin to reach pH 4.0 was recorded.

TABLE 6 pH Time to Reach pH 4.0, 850 micron beads, 800 rpm stirring

| Time Sec. | "A500/2788 OP" 117R/06/5 | A500 std. 154V/06/5 | A501P 133/05/5 | A600 (gel resin) |
|---|---|---|---|---|
| 0 | 1.4 | 1.4 | 1.4 | 1.4 |
| 16 | | | 2.0 | |
| 21 | 2.0 | | | |
| 22 | | 2.0 | | |
| 35 | 3.0 | | | |
| 36 | | | | |
| 40 | | | 3.0 | |
| 42 | 4.0 | | | |
| 44 | | 3.0 | 4.0 | |
| 48 | | 4.0 | | |
| 995 | | | | 2.0 |
| 8540 | | | | 3.0 |
| 23460 | | | | 4.0 |

Figure 7A:
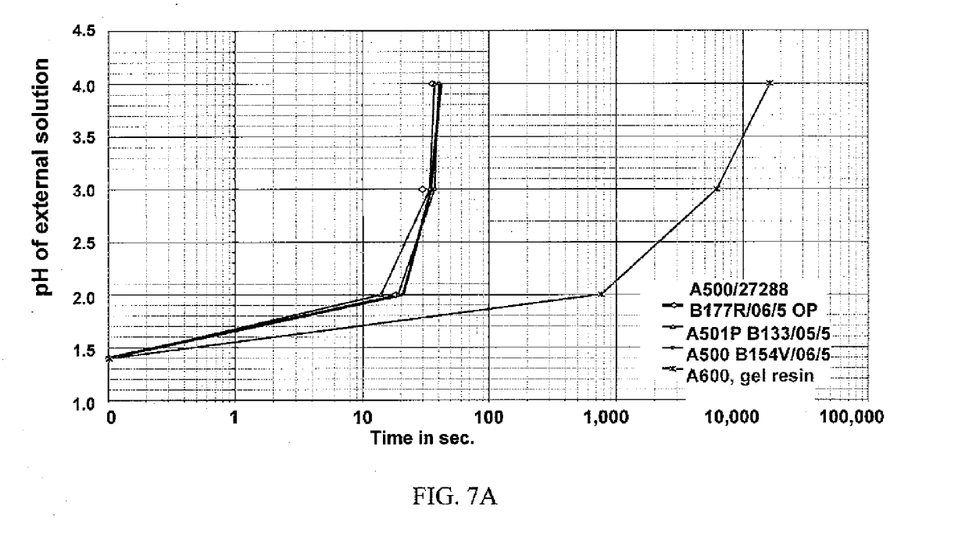
FIG. 7A. Kinetics of neutralization for four resins where time has a logarithmic axis.
Figure 7B:
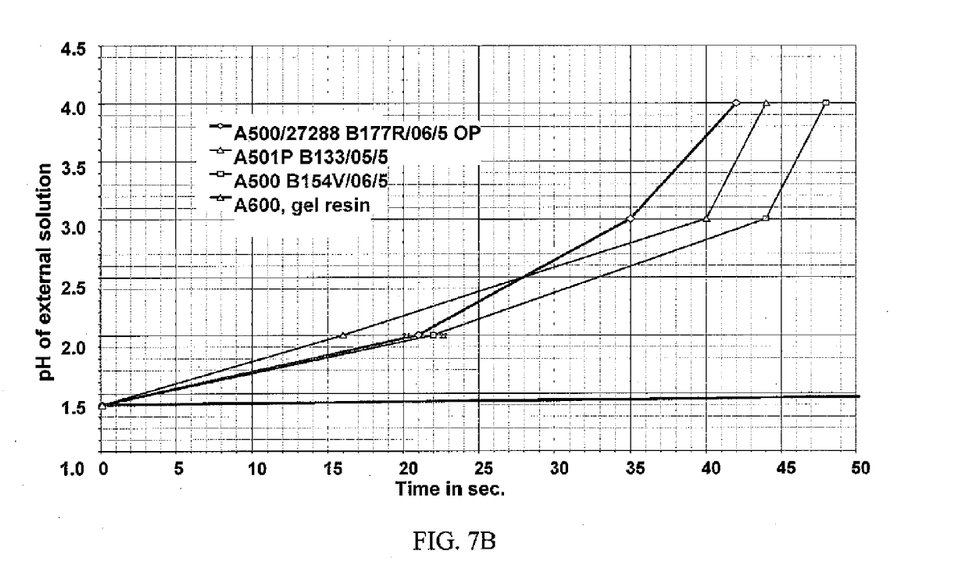
FIG. 7B shows the kinetics of neutralization for four resins where time has a linear axis for the kinetics of neutralization.

FIGS. 7A and 7B provide the kinetics of neutralization for these four resins.

Example 11

"Colloid" Removal

A complex surface water, to feed a reverse osmosis membrane, was passed through a cartridge containing 1.5 liters of "A500 Orthoporous (117R/06/5)" at 15 bed volumes per hour. The influent contained amongst TOC (12 mg/liter), color (6 mg PtCo/liter), some 15.4 mg/liter silica. The effluent contained 13.8 mg/liter silica, or a 10.4% reduction.

Using A501P, instead, and an influent containing TOC (4.3 mg/liter), color (10 mg PtCo/liter), and some 14.3 mg/liter silica, a reduction to 13.0 mg/liter silica or 9.1% was observed.

What is claimed is:

1. A macroporous copolymer comprising an average pore diameter of 5,000 Å to 200,000 Å, a breaking weight of 175 g/bead to 1000 g/bead, and an average particle diameter is between about 300 µm and 1200 µm.

2. The macroporous copolymer of claim 1, wherein the average pore diameter of the macroporous copolymer is 10,000-200,000 Å.

3. The macroporous copolymer of claim 1, wherein the copolymer has a breaking weight of at least 300 g/bead.

4. The macroporous copolymer of claim 1, wherein the average pore diameter of the macroporous copolymer is 50,000 Å-100,000 Å.

5. The macroporous copolymer of claim 1, wherein the copolymer is a macroporous resin.

6. The macroporous resin of claim 5, wherein the resin is an ion exchange resin.

7. A powder comprising the macroporous resin of claim 5.

8. The macroporous resin of claim 5, wherein the resin is formed by chloromethylating and aminating, or sulfonating the macroporous copolymer.

9. The macroporous resin of claim 5, wherein the resin is a cationic resin and the volume capacity of the resin is 1.1-2.4 eq/L.

10. A method of cleaning a fluid or gas stream comprising: flowing the fluid or gas stream through the macroporous copolymer of claim 1.

11. The method of claim 10, wherein a concentration of at least one of colloidal particles, silica, and metal oxides, slime, crude, fulvic acid, humic acid, tannic acid, viruses, polypeptides, yeast, bacteria cells, fungi, mold, algae, or lichens is reduced.

12. The method of claim 11, wherein the concentration is reduced by at least 90%.

13. The method of claim 10, wherein the average pore diameter of the macroporous copolymer is 1-10 µm.

14. A method of purifying a sample in a solution comprising flowing the sample through the macroporous resin of claim 5.

15. A column at least partially filled with an ion exchange resin, wherein the ion exchange resin is formed from the macroporous copolymer of claim 1.

16. A filtration element comprising a filtration medium and an ion exchange resin disposed on a surface of the filtration medium, wherein the ion exchange resin is formed from the macroporous copolymer of claim 1.

17. A macroporous copolymer comprising an average pore diameter of 5,000 Å to 200,000 Å, a breaking weight of 175 g/bead to 1000 g/bead, and an average particle diameter of between 50 µm and 5000 µm.

18. The macroporous copolymer according to claim 17, wherein the average particle diameter is between about 300 µm to about 5000 µm.

19. The macroporous copolymer according to claim 17, wherein the average particle diameter is between 50 µm and 1200 µm.

20. The macroporous copolymer according to claim 19, wherein the average particle diameter is between 50 µm and 500 µm.

21. The macroporous copolymer according to claim 17, wherein the average particle diameter is between 500 µm and 5000 µm.

* * * * *

UNITED STATES PATENT AND TRADEMARK OFFICE
CERTIFICATE OF CORRECTION

PATENT NO. : 8,496,121 B2
APPLICATION NO. : 12/056166
DATED : July 30, 2013
INVENTOR(S) : James A. Dale et al.

It is certified that error appears in the above-identified patent and that said Letters Patent is hereby corrected as shown below:

On the Title Page, Item (56)

Column 2
First page, under OTHER PUBLICATIONS, Line 1, delete "Hypesol-Macronet" and insert --Hypersol-Macronet--.

Column 2
Page 2, Line 1, delete "Seperations" and insert --Separations--.

Column 2
Page 2, Line 4, delete "Chromotography" and insert --Chromatography--.

Signed and Sealed this
First Day of October, 2013

Teresa Stanek Rea
*Deputy Director of the United States Patent and Trademark Office*